Patented Oct. 25, 1949

2,485,983

UNITED STATES PATENT OFFICE 2,485,983

ALKYLATION OF AMINOTRIAZINES

Daniel Elmer Nagy, Stamford, Conn., assignor to American Cyanamid Company, New York, N. Y., a corporation of Maine No Drawing. Application June 2, 1945, Serial No. 597,370

9 Claims. (Cl. 260—249.5)

This invention relates to a method for producing isomelamines. In particular it relates to a method of alkylating melamines with dimethyl sulfate and diethyl sulfate to produce the corresponding isomelamines.

In the present invention, the alkylation of melamine offers a new and economical method for the preparation of methyl and ethyl isomelamines. Heretofore, these materials have been made by a more complicated method.

The isomelamines prepared by the present invention are strong bases which readily form salts with acids and usually undergo the reactions characteristic of isomelamines. They are useful as intermediates in the preparation of ion exchange resins, as latent curing agents for resins, as textile dyeing assistants, and as chemical intermediates in a variety of synthetic organic chemicals in which the iso- or normal melamine structure is desired. The following examples are typical of the method used in the present invention.

EXAMPLE 1

Methyl isomelamine

| Reactants | Molar Ratio |
|---|---|
| Melamine | 1.0 |
| Dimethyl Sulfate | 1.0 |

A mixture of melamine and dimethyl sulfate is heated at 90°–100° C. for about 24 hours. The reaction mixture becomes a dry solid in 3 to 4 hours, and shows no appreciable exothermic tendencies. The dry solid is slurried with water and carefully made alkaline with enough alkali, preferably an alkali metal hydroxide such as sodium hydroxide, to liberate the free methyl isomelamine. This treatment is done at room temperature or lower, and at no point in this procedure is a clear solution obtained. The free base, which is substantially insoluble at this temperature, is then recovered from the aqueous solution of impurities by conventional means such as filtration.

Crude methyl isomelamine may be purified in several ways and may be recovered as the free base or an acid salt. For example, the crude free base may be dissolved in hot dilute acetic acid, and after removing any insoluble impurities, the free base is recovered by the addition of an alkali such as sodium hydroxide and by subsequent filtration of the precipitated solid. Sodium sulfate, when added to a solution of the acetate salt, precipitates the neutral sulfate of methyl isomelamine.

In another preparation, the same molar ratios of the above reactants are again heated for about 24 hours at substantially 100° C. The resulting crude solid reaction mixture is dissolved in sufficient water to make a clear solution at about 65° C. Since this material is acid, the warm solution is made neutral with sodium or potassium hydroxide. The addition of alkali causes any impurities which are present to precipitate, and these are then removed by common means such as filtration. The methyl acid sulfate salt of methyl isomelamine remains in solution from which the neutral sulfate salt is then precipitated by the addition of sodium sulfate. The colorless and purified free base is prepared from the above sulfate salt by reaction with sodium hydroxide.

Methyl isomelamine forms a colorless crystalline monohydrate which decomposes at 259°–260° C. and can be dehydrated at 70° C. under vacuum. The purified methyl isomelamine has the following properties: the free base is somewhat soluble in water, but insoluble in acetone; the acetate and phosphate salts are somewhat water soluble; the hydrochloride and nitrate salts are only slightly water soluble; the sulfate salt is practically insoluble in water, but dissolves in a sufficient excess of sulfuric acid; the free base liberates alkaline vapors when heated in water.

EXAMPLE 2

Ethyl isomelamine

| Reactants | Molar Ratio |
|---|---|
| Melamine | 1.0 |
| Diethyl Sulfate | 1.0 |

A mixture of melamine and diethyl sulfate is heated for 16 hours at 90°–100° C., then 16 hours at substantially 120° C. The reaction mixture is a slightly moist solid when cool. It is purified by slurrying with a large excess of water heated to about 65° C., and neutralizing with an alkali metal hydroxide. Any insoluble material or impurities are removed by filtration. The resulting solution of the ethyl acid sulfate salt of ethyl isomelamine is acidified with hydrochloric acid, whereupon colorless ethyl isomelamine hydrochloride precipitates. After recovery and drying, this salt decomposes at 309° C. The colorless and purified free base, which is easily prepared from the above salt by reaction with an alkali such as potassium or sodium hydroxide, decomposes at 270° C.

While the invention has been described with particular reference to specific embodiments, it is to be understood that it is not to be limited thereto but is to be construed broadly and to be restricted solely by the scope of the appended claims.

I claim:

1. A method of preparing a member of the group consisting of methyl isomelamine and ethyl isomelamine which comprises heating a mixture consisting of melamine and a member of the group consisting of dimethyl sulfate and diethyl sulfate, and recovering the thus-formed methyl isomelamine.

2. The method of claim 1 in which the alkylation is done at 90°–125° C.

3. A method of preparing methyl isomelamine which comprises heating a mixture consisting of melamine with dimethyl sulfate.

4. A method of preparing ethyl isomelamine which comprises heating a mixture consisting of melamine with diethyl sulfate, and recovering the thus-formed ethyl isomelamine.

5. The method of claim 3 in which the alkylation is done at 90°–125° C.

6. The method of claim 4 in which the alkylation is done at 90°–125° C.

7. A method of preparing methyl isomelamine which comprises heating a mixture consisting of melamine and dimethyl sulfate at substantially 100° C. for a period of at least 4 hours, mixing the resultant reaction mixture with water, neutralizing said aqueous mixture by the addition of an alkali metal base, filtering, making the resultant filtrate strongly alkaline and recovering the methyl isomelamine as the free base.

8. A method of preparing methyl isomelamine which comprises heating a mixture consisting of melamine and dimethyl sulfate at substantially 100° C. for a period of at least 4 hours, mixing the resultant reaction mixture with water, neutralizing said aqueous mixture by the addition of an alkali metal base, filtering, adding an excess of a neutral alkali metal sulfate to form the neutral sulfate of methyl isomelamine, and recovering the methyl isomelamine.

9. A method of preparing ethyl isomelamine which comprises heating a mixture consisting of melamine and diethyl sulfate at substantially 120° C. for a period of at least 16 hours, mixing the resultant reaction mixture with water, neutralizing said aqueous mixture by the addition of an alkali metal base, filtering, adding an excess of hydrochloric acid to form the ethyl isomelamine hydrochloride, and recovering the latter.

DANIEL ELMER NAGY.

REFERENCES CITED

The following references are of record in the file of this patent:

UNITED STATES PATENTS

| Number | Name | Date |
| --- | --- | --- |
| 1,550,749 | Schafer | Aug. 25, 1925 |
| 2,197,357 | Widmer | Aug. 16, 1940 |
| 2,222,350 | Keller | Nov. 19, 1940 |
| 2,228,161 | Zerweck | Jan. 7, 1941 |

OTHER REFERENCES

"Unit Processes in Organic Chemistry," by Groggins (1938), pp. 488, 492, 494.